United States Patent [19]

Schmidt et al.

[11] Patent Number: 4,798,521
[45] Date of Patent: Jan. 17, 1989

[54] SYSTEM AND METHOD FOR REGULATING PRESSURE IN A CONTAINER

[75] Inventors: Lothar Schmidt, Kerpen-Sindorf; Hans-Joachim Schumbert, Wesseling, both of Fed. Rep. of Germany

[73] Assignee: Leybold-Heraeus GmbH, Cologne, Fed. Rep. of Germany

[21] Appl. No.: 45,492

[22] Filed: May 4, 1987

[30] Foreign Application Priority Data

May 2, 1986 [EP] European Pat. Off. ........ 86106040.8

[51] Int. Cl.⁴ .................... F04B 49/06; F16K 31/12
[52] U.S. Cl. .................... 417/295; 137/110; 137/487.5
[58] Field of Search .............. 137/487.5, 110; 417/295

[56] References Cited

U.S. PATENT DOCUMENTS

| | | | |
|---|---|---|---|
| 3,516,429 | 6/1970 | Sandstode et al. | 137/110 |
| 3,690,115 | 9/1972 | Clayton | 137/487.5 |
| 4,089,007 | 5/1978 | Perry | 137/110 |
| 4,253,480 | 3/1981 | Kessel | 137/487.5 |
| 4,431,020 | 2/1984 | Kowalski | 137/487.5 |
| 4,679,583 | 7/1987 | Lucas | 137/487.5 |
| 4,687,014 | 8/1987 | Gobal | 137/487.5 |
| 4,690,163 | 9/1987 | Steinemann | 137/487.5 |

FOREIGN PATENT DOCUMENTS

| | | |
|---|---|---|
| 0057581 | 1/1982 | European Pat. Off. . |
| 0093191 | 5/1982 | European Pat. Off. . |
| 0149010 | 10/1984 | European Pat. Off. . |
| 1211450 | 2/1966 | Fed. Rep. of Germany . |
| 81252 | 5/1970 | Fed. Rep. of Germany . |
| 3215972 | 4/1982 | Fed. Rep. of Germany . |
| 47912 | 12/1979 | Japan ................. 137/487.5 |

OTHER PUBLICATIONS

"Information New Products", MR16 Diaphragm Pressure Regulator, Leybold-Heraeus GMBH, Supplement to Catalogue HV 250, Section 9, New Edition, Aug. 1982.

Primary Examiner—William L. Freeh
Attorney, Agent, or Firm—Spencer & Frank

[57] ABSTRACT

A system for regulating pressure in a container. The system includes a membrane pressure regulator with a reference pressure chamber containing a reference pressure, and a vacuum pump connected to the container via the membrane pressure regulator. The system further includes a gas inlet valve connected to the reference pressure chamber for increasing the reference pressure; a gas outlet valve connected to the reference pressure chamber for decreasing the reference pressure; and a regulator connected to the gas inlet valve and the gas outlet valve for actuating the valves. The regulator includes a device for generating a desired pressure value for the container and a measuring member connected for providing an indication of the pressure in at least one of the reference pressure chamber and the container.

9 Claims, 3 Drawing Sheets

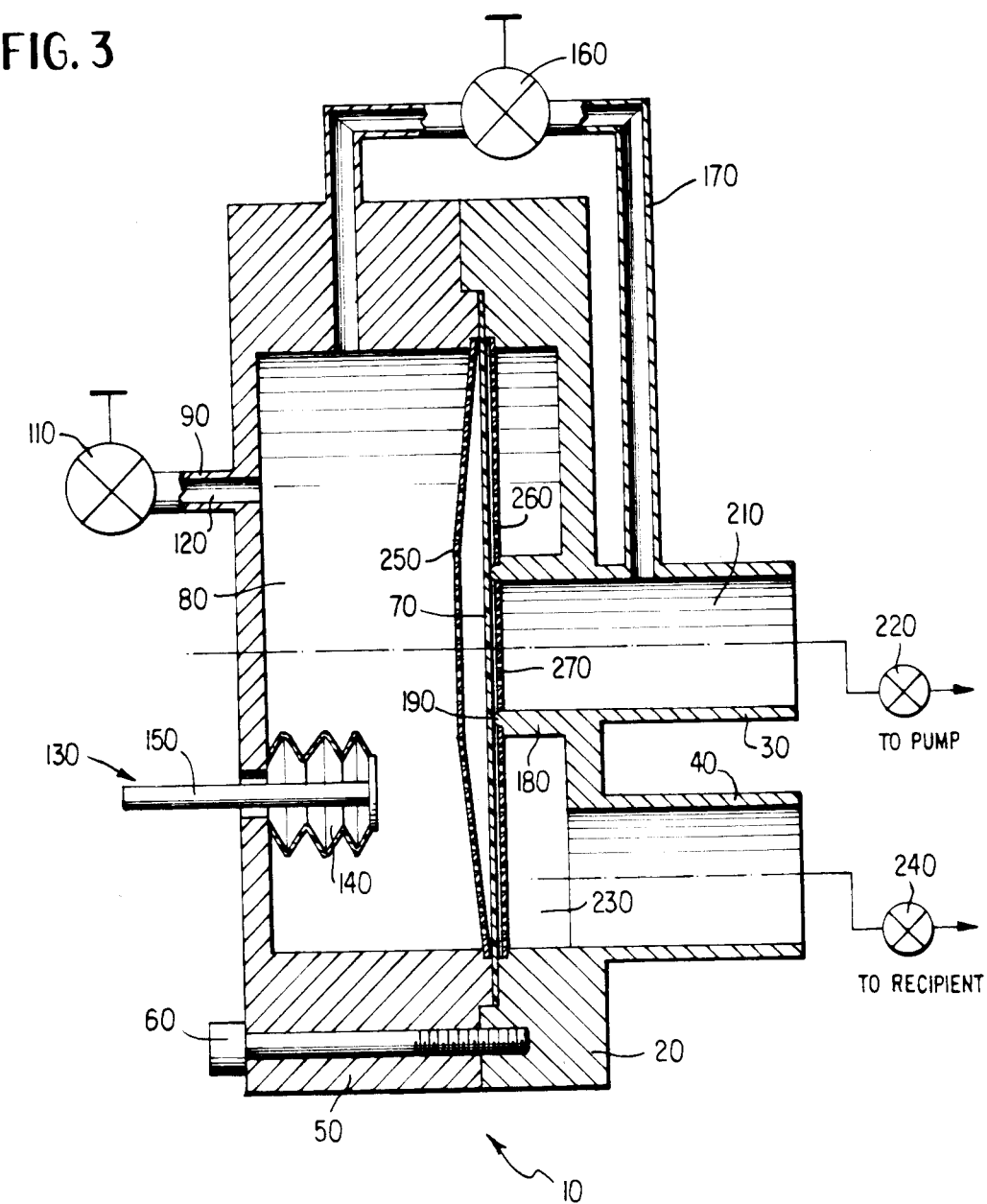

SYSTEM AND METHOD FOR REGULATING PRESSURE IN A CONTAINER

BACKGROUND OF THE INVENTION

The present invention relates to a system for regulating the pressure in a container with the aid of a vacuum pump which is connected to the container by means of a membrane pressure regulator equipped with a reference pressure chamber. The invention also relates to a method of regulating the container pressure with a system of this type.

It is often necessary to keep a constant pressure in a container (e.g. a vacuum chamber or processing chamber) in which, for example, a vapor-deposition, etching or drying process or the like takes place or to adapt the pressure in a certain manner to the process taking place in the container.

For example, it is known from East German Pat. No. 81,252 to keep the pressure in a vacuum system constant by intermittently opening servo-controlled needle valves. It is further known from this document to switch in or out additional vacuum pumps or to provide a choke flap in the suction line to enlarge or decrease the suction cross section. Finally, this document describes the regulation of the number of pumping revolutions of a rotating pump. It is difficult to properly dimension methods and apparatus of this type, and their dynamic characteristics, in particularly, pose problems.

German Offenlegungsschrift [laid-open patent application] No. 3,215,972 discloses a membrane pressure regulator which is disposed between the container and the vacuum pump and which serves the purpose of keeping a constant pressure within the container. For this purpose, a reference pressure chamber is accommodated in the pressure regulator housing, with one side of this chamber being formed by a membrane. The membrane serves as a setting member for the connection between the container and the vacuum pump. If the pressure in the reference pressure chamber corresponds to the pressure in the container, the connection between container and vacuum chamber is closed. If the pressure in the container increases, the membrane establishes a connection between the container and the vacuum pump. Membrane pressure regulators of this type can be used in a pressure range from 10 to 1000 mbar. Due to their very non-problematic dynamic behavior, having not tendency to vibrate over the entire pressure range, these membrane pressure regulators are particularly suitable to maintain a constant pressure in a container. By changing the reference pressure, regulators of this type can also be used, in principle, for pressure regulation in the container.

SUMMARY OF THE INVENTION

It is an object of the present invention to provide a system of the above-mentioned type which permits integration of a mechanically operating membrane pressure regulator in an automatic control system.

The above and other objects are accomplished, according to the present invention, in the context of a system as first described above, by the provision of a gas inlet valve connected to the reference pressure chamber of the membrane pressure regulator to increase the reference pressure, a gas outlet valve connected to the reference pressure chamber to reduce the reference pressure, and a regulator connected for actuation of these valves. The regulator includes an associated desired value input and at least one pressure measuring member connected for measuring the pressure in at least one of the reference pressure chamber and the container.

In a membrane regulator of this type, the pressure in the reference pressure chamber can be set in a simple manner and can be changed according to a fixed, given program so that the particular advantages of the prior art membrane pressure regulator can also be utilized if automatic regulation or control is desired. Moreover, remote controlled and/or computer supported operation of the membrane regulator becomes possible.

The pressure measuring member may be connected to the container or to the reference pressure chamber of the membrane pressure regulator. The latter measure is of particular advantage if, due to fast pressure fluctuations in the container during a process sequence, there exists the danger of the currents of vibration phenomena, as will be discussed below. Process and specific pressure fluctuations are regulated out exclusively by the membrane regulator. If two regulating circuits exist, the reference pressure regulating circuit is not influenced by the pressure fluctuations in the container so that the above mentioned regulating vibrations are eliminated.

It is of particular advantage if a pressure measuring member is provided which is connected to the container in addition to a pressure measuring member which is connected to the reference pressure chamber of the membrane pressure regulator. These measures make it possible, as will be explained below, to effect automatic process pressure regulation with increased accuracy and to cause the reference pressure to follow pursuant to the deviations between given (desired) and measured process pressures of the container. With such a system, the accuracy of the membrane pressure regulator, which is a function of the gas throughput, can be increased from 96% to better than 99%.

BRIEF DESCRIPTION OF THE DRAWINGS

FIG. 3 is cross-sectional view of a pressure regulator used in the system according to the invention.

DESCRIPTION OF THE PREFERRED EMBODIMENT

Figure 1:
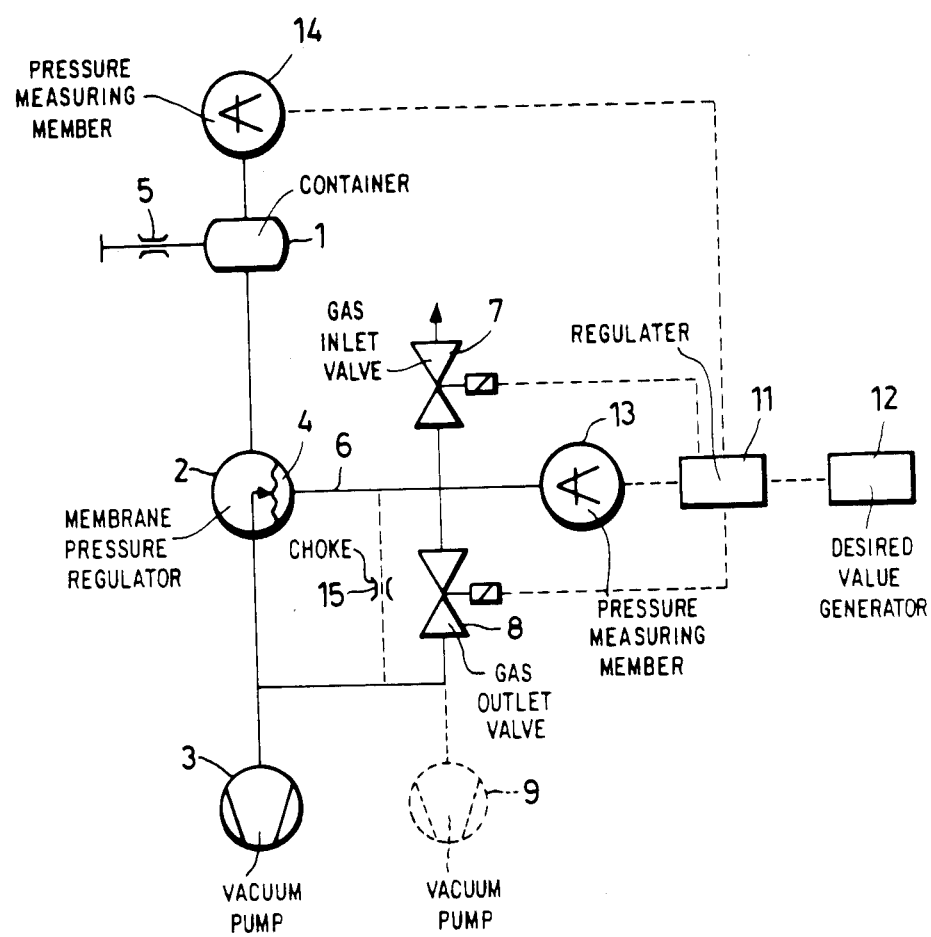
FIG. 1 is a schematic view of the system according to the invention.

FIG. 1 shows a container 1 to which is connected, by way of a membrane pressure regulator 2 which is used to control the process pressure within container 1 and a vacuum pump 3. A membrane pressure regulator 2 of the type employed is disclosed in German Offenlegungsschrift No. 3,215,972. Which is further described in connection with FIG. 3. Briefly, its reference pressure chamber is marked 4. To adjust the reference pressure, a regulation valve between a control chamber and the reference system pressure is attained.

The reference pressure adjusted in the reference chamber in this simple way is acting on the membrane. When equal pressures in reference chamber and control chamber are achieved, the membrane flexes toward a throttle point and shuts off the vacuum pump.

When the pressure in the system rises due to gas accumulation, the membrane flexes away from the throttle point depending on the pressure difference between the reference chamber and the control chamber and the pumping path is set free. Container 1 is equipped with a gas inlet nozzle 5 to ensure a minimum gas input (e.g. 0.1 mbl/sec) which is required for operation of membrane pressure regulator 2.

To be able to automatically and remotely control or change the setting of the reference pressure in reference pressure chamber 4, valves 7 and 8 are provided which are connected via a line 6 to reference pressure chamber 4. Valve 7 performs the function of a gas inlet valve and, when open, establishes a connection between reference pressure chamber 4 and the atmosphere or a gas supply (not shown), for example a supply of inert gas in an embodiment intended for areas endangered by explosion. Valve 8 performs the function of a gas outlet valve. When open, it establishes a connection between reference pressure chamber 4 and the inlet to process vacuum pump 3. Alternatively, the valve 8 may be connected to the inlet of a separate vacuum pump 9 as shown in dashed lines if, for special reason, process vacuum pump 3 cannot be employed.

Valves 7 and 8 are controlled with the aid of a regulator 11. The input valve fed to regulator 11 is a desired value furnished, for example, by a desired value generator 12 shown schematically as a block. Internal manual inputs or other external control signals are also conceivable. Regulator 11 further receives input values from pressure measuring members 13 and 14 which correspond, respectively, to the reference pressure in reference pressure chamber 4 and to the process pressure in container 1. Known vacuum measuring devices which furnish the measured pressure values in the form of electrical signals are suitable for implementing measuring members 13 and 14.

If the process pressure in container 1 is to be kept constant, regulator 11 receives the desired process pressure as a manual or an externally provided desired value. Regulator 11 then actuates the open-shut valves 7 and/or 8 until the desired process pressure in container 1 has been reached. Only one of the two measuring members 13 and 14 is sufficient to keep the process pressure constant. The signals furnished by the respective measuring members 13, 14 are compared in regulator 11 with the respective desired value. If the actual pressure in container 1 is too high, valve 8 is opened for a short period of time so that the reference pressure in reference pressure chamber 4 is reduced. This increases the suction capability of vacuum pump 3. If, on the other hand, the measured actual pressure in container 1 is too low, valve 7 is opened for a short period of time so that the pressure in reference pressure chamber 4 is increased. This step results in a reduction of the suction capability of vacuum pump 3.

If, due to a process taking place in container 1, the danger of fast high pressure fluctuations exists which could result in undesirable vibration phenomena, it is advisable to use the pressure in reference pressure chamber 4 as the actual pressure value. Pressure fluctuations of the level to be expected in container 1 will no longer occur in the reference pressure chamber so that the danger of the occurrence of vibration phenomena is substantially reduced.

The two pressure measuring members 13 and 14 can also be employed in combination in two successive regulating steps. According to this aspect of the invention, the desired process pressure is initially given to regulator 11 as the desired value. In a first regulating step, regulator 11 sets the reference pressure to be equal to or almost equal to the desired process pressure. This is done, as described above, by actuation of valves 7 and 8 until measuring member 13 indicates the desired reference pressure. As soon as the process pressure determined by measuring member 14 is sufficiently constant, a new, possibly changed desired reference pressure is determined in a second regulating step from the deviation between the initially set given process pressure (desired value) and the measured process pressure determined by measuring member 14. Thereafter, the reference pressure is set by regulator 11 to the new desired reference pressure. This new setting of membrane pressure regulator 4 results in a new setting of the process pressure, thus realizing a more precise approach of regulating the process pressure to the desired process pressure given as the desired value. The second regulating step is then repeated at suitable time intervals. Therefore, the above-described system automatically reacts to process conditions which change over time. If the given desired value is changed, the first regulating step must be repeated. At the same time, a pressure regulating method of this type can be used to eliminate the inaccuracy of the membrane pressure regulator as a function of gas throughput so that a regulating inaccuracy of less tan 1% results.

The embodiment illustrated in FIG. 1 shows a further variation in dashed lines. Gas outlet valve 8 may be replaced by a choke 15, shown in dashed lines. Prerequisite for this is that gas inlet valve 7 is a dynamically regulatable valve whose opening cross section is controlled by regulator 11.

In the last said case using a choke 15 and a dynamically regulatable gas inlet valve 7 one embodyment is given by the valve RV100, Kat.-Nr. 15891, from LEYBOLD—HERAEUS GmbH and the regulator AR100, Kat.-Nr. 15890, from LEYBOLD—HERAEUS GmbH.

Figure 2:
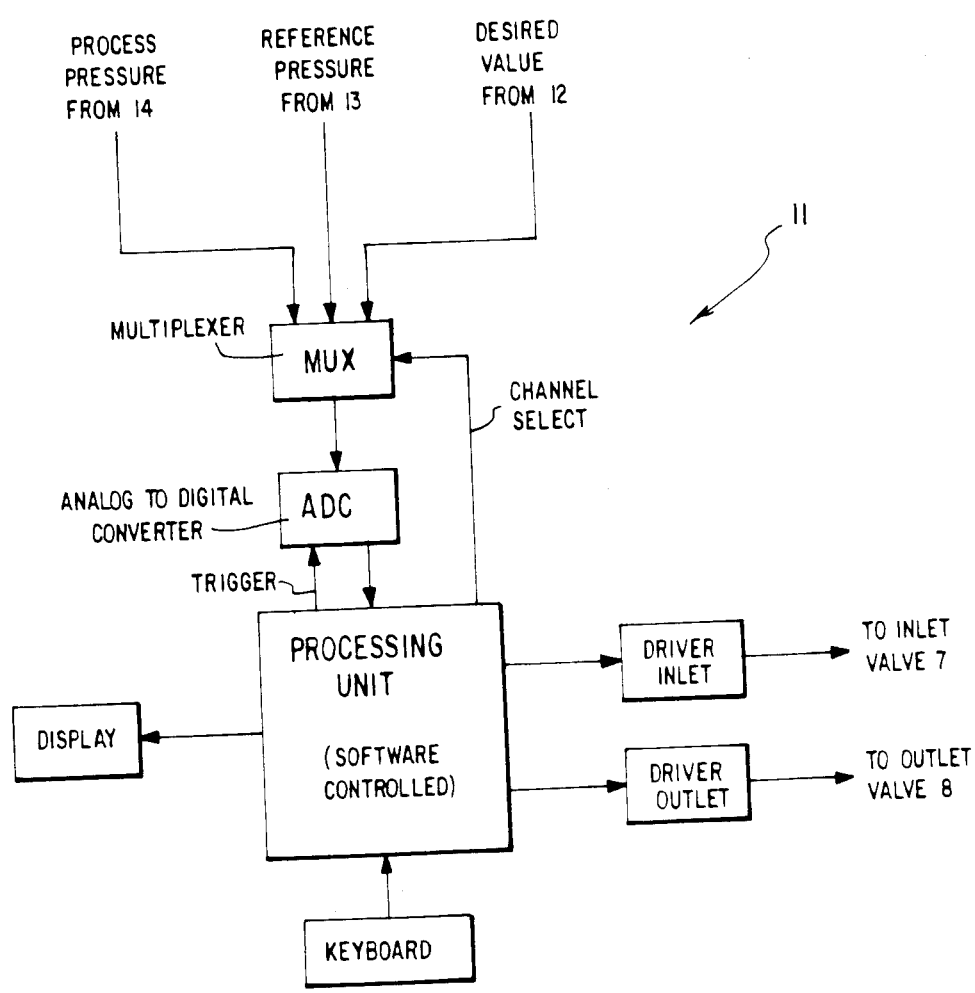
FIG. 2 is a schematic view of the regulator in the system according to the invention.

- In the case of using the open-shut valves 7 and 8 to control the reference pressure in the reference pressure chamber 4 of the membrane pressure regulator 2 one embodyment of the regulator 11 is shown in FIG. 2. The main element of that regulator is a software controlled Processing Unit. The software realizes the procedure discribed above with reference to regulator 11. The Processing Unit is added by an analog to digital converter and a multiplexer to measure the process pressure given by the pressure measuring member 14, the reference pressure given by the pressure measuring member 13 and the desired value given by the desired value generator 12. It is also added by an inlet driver and an outlet driver referring to the gas inlet valve 7 and the gas outlet valve 8. A display is added to show the process pressure, the reference pressure or the desired value alternatively. Besides the desired value generator 12 the added keybord can be used to put in a desired value.

FIG. 3 illustrates a pressure regulator which includes a housing 10, preferably made of stainless steel and composed essentially of a flange member 20 equipped with connecting pipes 30 and 40 leading to the vacuum pump and the container 1, respectively, and a cover 50. A diaphragm 70 is stretched between these two components which are connected together by means of several screws 60. This creates a chamber 80 on the left side of diaphragm 70—in the illustrated embodiment—which serves as the reference pressure chamber. It includes a port 90 equipped with a valve 110. Through this valve 110, the reference pressure chamber can be evacuated and flooded (set to the desired pressure) and this occurs independently of conditions in the pump and in the container 1. For example, the regulating pressure can be set through this valve with a gas foreign to the process or the desired pressure can be changed during the process.

Additionally, a choke 120 is provided in connecting pipe 90 to facilitate setting of the desired pressure.

Moreover, reference pressure chamber 80 also has an associated device 130 for finely setting the desired pressure during operation. This device is composed of a displacement element 140 preferably in the form of a bellows which can be introduced by means of a forcer 150 to different depths into the reference pressure chamber. This is preferably done with the aid of a set screw (not shown) which is guided on forcer 150 by means of a fine thread.

By way of a connecting conduit 170 equipped with a valve 160, reference pressure chamber 80 can be connected with connecting pipe 30 which leads to the vacuum pump. Thus it is additionally possible to evacuate reference pressure chamber 80—with the valves in the appropriate positions—to, for example, completely pump out reference pressure chamber 80 and thus remove undesired condensable process gases. The desired pressure can be set at the same time.

Connecting pipe 30 leading to the vacuum pump includes an extension 180 in the form of a pipe section which projects into the interior of housing 10 and whose frontal face 190 lies approximately in the plane of the diaphragm and is configured in the manner of a valve seat (e.g. equipped with a bead). Connecting pipe 30 and pipe section 180 are arranged centrally with respect to housing 10 and form a chamber 210 which is in communication with the vacuum pump by way of a valve 220. Thus, pipe end 180 forms a further chamber 230 around itself which is in communication with the container 1 by way of a connecting pipe 40 and a valve 240. The dimensions are selected in such a manner that the surface area of diaphragm 70 associated with annular chamber 230 is substantially larger than its surface area associated with central chamber 210, thus preventing the occurrence of "sticking" of diaphragm 70 on frontal face 190 of pipe end 180.

Advisably diaphragm 70 is made of a material which is highly compatible with chemical gases. Such materials are, for example, polyurethane, Perbunan, chlorotrifluoroethylene, silicone or the like. To avoid overexpansion of the diaphragm, perforated supporting faces 250, 260 and 270 are provided. On the side of reference pressure chamber 80, supporting face 250 essentially has the shape of a flat cone frustum. Supporting face 260 is annular and avoids overexpansion of the diaphragm into chamber 230. Supporting face 270 is provided for the side of diaphragm 70 facing chamber 210.

Regarding operation: as already mentioned, the desired pressure in reference pressure chamber 80 can be preset either by way of connecting pipe 90 or by way of conduit 170 and can be regulated during operation by means of fine regulating device 130. During operation, i.e. with valves 220 and 240 open, the diaphragm then exposes the opening of pipe end 180 as long as the pressure in the container 1 is greater than the pressure in reference pressure chamber 80. Once the pressure in the container 1 reaches the reference chamber pressure and falls below it, diaphragm 70 closes the opening formed by the frontal face 190 of pipe 180 and thus separates the vacuum pump from the container 1. As a whole, the effect is such that the effective suction capability at the container 1 is set to be proportional to the pressure difference between the container 1 and the reference pressure chamber. Depending on the type and size of the pressure regulator, the gas throughput range can be regulated between 0 and more than 100 m$^3$/h. Thus, the regulator is particularly well suited for process containers operating in a coarse vacuum.

The following correspondences are present between FIGS. 1 and 3:

| FIG. 1 | FIG. 3 |
| --- | --- |
| Reference pressure chamber 4 | Reference pressure chamber 80 |
| Connection with vacuum pump 3 | Connecting pipe 30 |
| Connection with container 1 | Connecting pipe 40 |

The present disclosure relates to the subject matter disclosed in European Ser. No. 86 106 040.8 of May 2nd, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a system for regulating pressure in a container and having a membrane pressure regulator with a reference pressure chamber containing a reference pressure and a vacuum pump connected to the container via the membrane pressure regulator, the improvement comprising:
   a gas inlet valve connected to said reference pressure chamber for increasing the reference pressure;
   a pressure decreasing means connected to said reference pressure chamber for decreasing the reference pressure; and a
   regulator means connected to said gas inlet valve and said pressure decreasing means for actuating said valve and said pressure decreasing means, said regulator means including a desired value generating input means for generating a desired pressure value for said container and measuring means including a first measuring member connected to the container for measuring the pressure in the container and a second measuring member connected to the reference pressure chamber for measuring the pressure in the reference pressure chamber.

2. System as defined in claim 1, and further comprising a supply of inert gas connected to the intake side of said gas inlet valve.

3. System as defined in claim 1, wherein said pressure decreasing means is a choke and said gas inlet valve is a dynamically regulatable gas inlet valve, and said regulator means is connected solely to said dynamically regulatable gas inlet valve for actuating such valve.

4. System as defined in claim 1, wherein said pressure decreasing means is a gas outlet valve.

5. System as defined in claim 4, wherein said gas outlet valve is connected to the vacuum pump.

6. System as defined in claim 4, and further comprising a separate vacuum pump to which said gas outlet valve is connected.

7. System as defined in calim 4, wherein said gas inlet and outlet valves are open-shut valves.

8. In a method for regulating pressure in a container of a system having a membrane pressure regulator with a reference pressure chamber containing a reference pressure, and a vacuum pump connected to the container via the membrane pressure regulator, the method comprising:

measuring the pressure in the container and the reference pressure chamber;

comparing the measured pressures with a desired pressure for the container; and controlling the pressure in the reference pressure chamber, via at least one of a gas inlet valve and a gas outlet valve connected to the reference pressure chamber, in dependence on the comparison between the measured actual pressure and the desired pressure for the container.

9. Method according to claim 8, wherein said measuring step comprises measuring the pressure in the reference pressure chamber and said controlling step includes controlling the pressure in the reference pressure chamber until it reaches the desired pressure; and further comprising: measuring, subsequent to said controlling step, the pressure in the container; determining a new desired reference pressure in dependence on a deviation between the desired pressure and the measured pressure in the container; and regulating, via said at least one of a gas inlet valve and gas outlet valve, the pressure in the reference pressure chamber to set the reference pressure to the new desired reference pressure.

* * * * *